F. H. EMERY.
SLATE PICKER.
APPLICATION FILED JUNE 17, 1911.
1,013,647.
Patented Jan. 2, 1912.
2 SHEETS—SHEET 1.
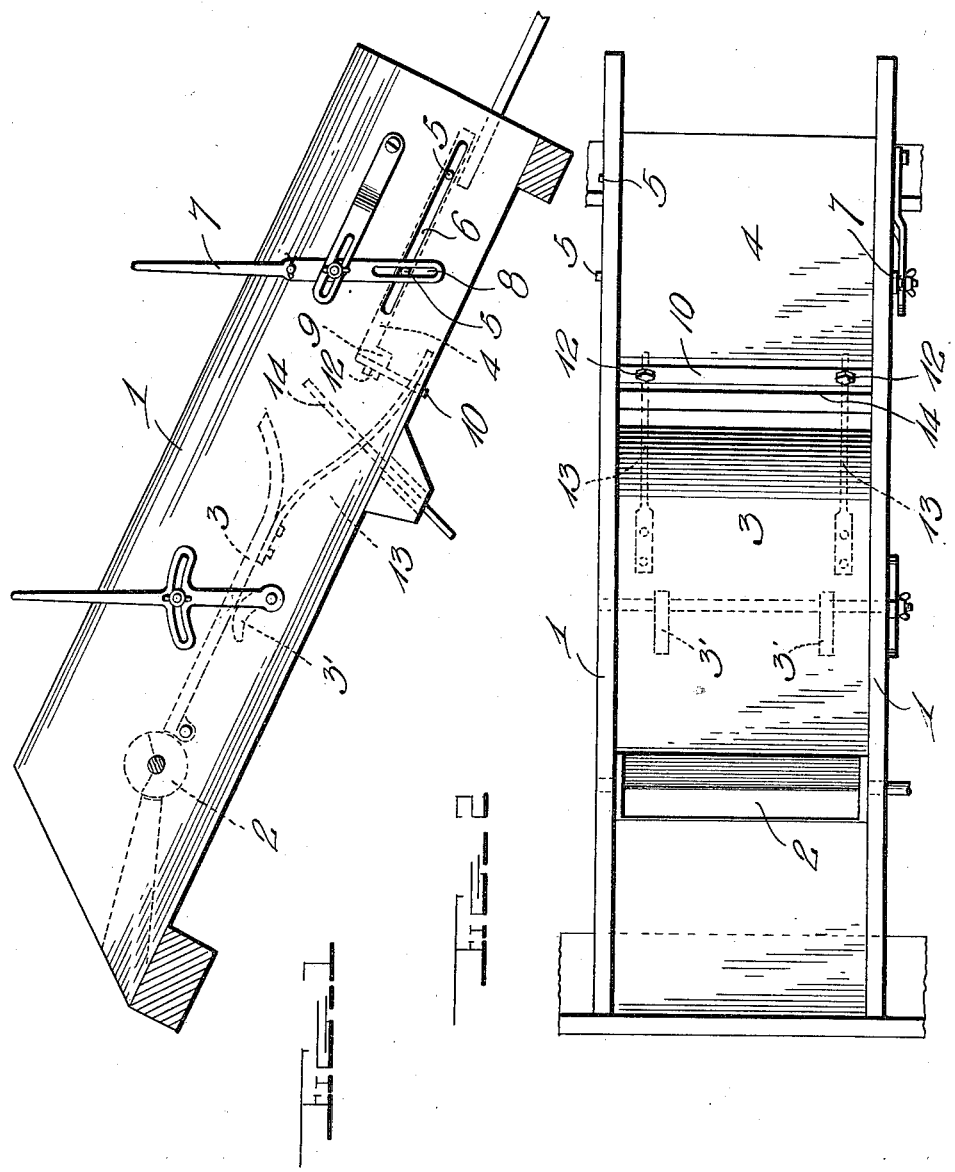
Witnesses
Inventor
Frederick H. Emery.
By William D. Deane
his Attorney

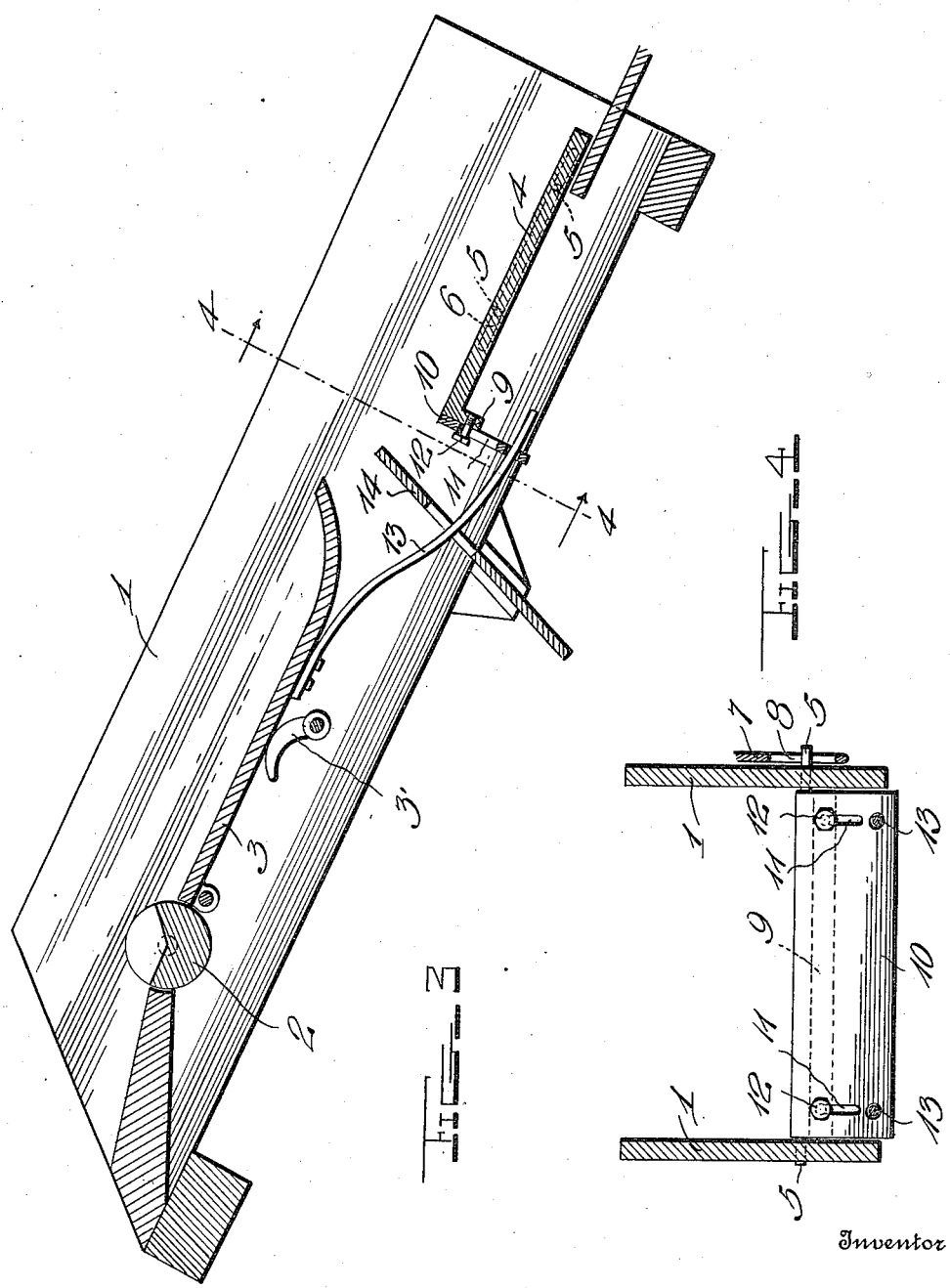

UNITED STATES PATENT OFFICE.

FREDERICK H. EMERY, OF SCRANTON, PENNSYLVANIA.

SLATE-PICKER.

1,013,647.  Specification of Letters Patent.  Patented Jan. 2, 1912.

Application filed June 17, 1911. Serial No. 633,765.

*To all whom it may concern:*

Be it known that I, FREDERICK H. EMERY, citizen of the United States, residing at Scranton, in the county of Lackawanna and State of Pennsylvania, have invented certain new and useful Improvements in Slate-Pickers, of which the following is a specification.

This invention has relation to slate pickers, and has for its object to provide a trough provided with a curved bottom mounted for movement so that it may be adjusted at a desired angle with relation to a horizontal. In conjunction with the said bottom the trough is provided with a pan located beyond the delivery end of the bottom and which is arranged to be adjusted longitudinally with relation to the bottom. A gate is carried at the receiving end of the pan and is adapted to move with the pan and means is provided for shifting the gate transversely of the pan as the delivery end of the bottom is adjusted up or down.

In the accompanying drawings: Figure 1 is a side elevation. Fig. 2 is a plan view. Fig. 3 is a vertical, longitudinal section on an enlarged scale. Fig. 4 is a transverse vertical section, taken on line 4—4 of Fig. 3.

Corresponding and like parts are referred to in the following description and indicated in all the views of the accompanying drawings by the same reference characters.

The picker consists of a trough 1 which is supported in inclined position and which is provided at its upper end portion with a feeder 2 of any desired pattern. A curved bottom 3 is pivotally mounted between the sides of the trough 1 and a lever operated cam 3' engages the under side of the said bottom 3 and is adapted to swing the said bottom upon its pivotal support as it is turned. A pan 4 is slidably mounted for edgewise movement between the sides of the trough 1 and is provided at its ends with pins 5 which pass through elongated slots 6 provided in the sides of the trough 1. A lever 7 is fulcrumed upon the trough 1 and is provided with a slot 8 which receives one of the pins 5. Therefore it will be seen that by swinging the lever 7 the pan 4 may be moved edgewise toward or away from the delivery end of the bottom 3. The pan 4 is provided at its receiving edge with a downturned flange 9 and a gate 10 is slidably mounted at the receiving edge of the pan 4. The said gate is provided with a series of elongated slots 11 which are disposed transversely of the pan 4 and which loosely receive bolts 12 mounted upon the flange 9 of the said pan. Bracket arms 13 are fixed to the under side of the bottom 3 and project through the lower portion of the gate 10. The said arms 13 are slidably received by the gate 10 and a plate 14 is located in the trough 1 between the delivery end of the bottom 3 and the receiving edge of the pan 4. The plate 14 is fixed with relation to the trough 1 and its upper edge is spaced from the bottom 3 and the pan 4.

In operation the mixed coal and slate is passed from the feeder 2 down upon the upper surface of the bottom 3 along which it gravitates. As the material arrives at the delivery edge of the said bottom 3 it is deflected in an upward direction by the curved configuration of the said bottom and the lumps of coal pitch over and land upon the upper surface of the pan 4. Some of the coal and some of the slate fall short of the pan 4 but pass over the upper edge of the plate 14 and fall down between the said plate and the pan 4, while most of the slate barely clears the delivery edge of the bottom 3 and falls from the same between the bottom and the plate 14. Thus the material is separated into three grades, namely; superior coal; inferior or mixed coal and slate; and pure slate.

Under different conditions and with different kinds of coal and slate it is necessary to increase or diminish the space between the receiving edge of the pan 4 and the upper edge of the plate 14. Under these conditions it is sometimes desirable to pitch the bottom 3 at different angles with relation to a horizontal, but the upper edge of the gate should always maintain the same position vertically with relation to the upturned extremity of the delivery edge of the bottom 3, notwithstanding the fact that the said gate is shifted longitudinally with relation to the bottom 3 as the pan 4 is moved longitudinally. Therefore when the delivery end portion of the bottom 3 is adjusted vertically the bracket arms 13 will move the gate 10 correspondingly in a direction transversely of the pan 4, whereby the said gate will increase or diminish the transverse sectional area of the opening between the pan 4 and the upper edge of the plate 14 and at the same time when the pan 4 is shifted longitudinally the gate 10 moves therewith so that its position with relation to the delivery end of the bottom 3 in a direction longitudinally of the trough 1 is varied. These adjustments may be accomplished while the apparatus is in operation and therefore the parts may be positioned to properly handle the material according to its nature or conditions that might prevail. Thus the separation of the material as above indicated may be accurately accomplished by the picker irrespective of the characteristics and conditions governing the material.

Having thus described the invention, what is claimed as new is:

1. A picker comprising a trough, a bottom pivoted therein, a pan slidably mounted in the trough below the delivery end of the bottom, a plate located between the delivery end of the bottom and the receiving end of the pan, a gate carried at the receiving end of the pan, and means connecting the gate with the bottom to move the gate transversely of the pan as the position of the bottom is adjusted.

2. A picker comprising a trough, a bottom adjustably mounted therein, a pan adjustably mounted therein, a gate located between the bottom and the pan and adjustable with both the bottom and the pan.

3. A picker comprising a trough, a bottom adjustably mounted therein, a pan adjustably mounted therein, a gate located between the bottom and the pan and adjustable with both the bottom and the pan and mounted so that the adjustment of the pan does not disturb the adjustment of the bottom and vice versa.

4. A picker comprising a trough, a bottom adjustably mounted therein, a pan adjustably mounted therein, a gate slidably mounted upon the pan and slidably engaged by the bottom.

5. A picker comprising a trough, a bottom adjustably mounted therein, a pan adjustably mounted therein, a gate supported by the pan between the pan and the bottom, said gate having slots, bolts carried by the pan and passing through said slots, and arms carried by the bottom and passing slidably through the gate.

In testimony whereof I affix my signature in presence of two witnesses.

FREDERICK H. EMERY.

Witnesses:
A. L. HOUGH,
THOS. R. HUGHES.

Copies of this patent may be obtained for five cents each, by addressing the "Commissioner of Patents. Washington, D. C."